United States Patent
Mendicino et al.

(10) Patent No.: US 9,511,694 B2
(45) Date of Patent: Dec. 6, 2016

(54) MOTOR VEHICLE SEAT HAVING AN ARMREST

(71) Applicant: Ford Global Technologies, LLC, Dearborn, MI (US)

(72) Inventors: Teresa Mendicino, London (GB); Torsten Gerhardt, London (GB); David Woodhouse, Bromsgrove (GB); Lewis Blaber, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 14/076,942

(22) Filed: Nov. 11, 2013

(65) Prior Publication Data
US 2015/0102641 A1 Apr. 16, 2015

(30) Foreign Application Priority Data

Oct. 16, 2013 (GB) .................................. 1318275.3

(51) Int. Cl.
*B60N 2/46* (2006.01)
*B60N 3/10* (2006.01)
*B60N 2/01* (2006.01)

(52) U.S. Cl.
CPC ........... *B60N 2/4613* (2013.01); *B60N 2/4606* (2013.01); *B60N 2/468* (2013.01); *B60N 2/4633* (2013.01); *B60N 2/01* (2013.01); *B60N 3/10* (2013.01); *B60N 3/101* (2013.01)

(58) Field of Classification Search
CPC B60N 2/4606; B60N 2/4633; B60N 2/4613; B60N 2/01; B60N 2/468; B60N 3/10; B60N 3/101; A47C 7/543
USPC ................. 297/411.39, 188.04, 411.32, 238, 297/188.14, 257, 113, 114, 117, 163, 112, 297/411.29, 411.28, 411.3, 411.31, 188.17, 297/411.38
See application file for complete search history.

(56) References Cited

U.S. PATENT DOCUMENTS 1,379,499 A * 5/1921 Williford ............... B61D 33/00
 297/112
2,710,049 A * 6/1955 Potocnik .............. B60N 2/4613
 297/113

(Continued)

FOREIGN PATENT DOCUMENTS

DE 19702572 A1 2/1998
DE 19916179 A1 10/2000

(Continued)

OTHER PUBLICATIONS

Madabout News, "MEV announce the new R2," Dec. 12, 2007 (3 pages), Madabout Kitcars.com.

(Continued)

*Primary Examiner* — Milton Nelson, Jr.
(74) *Attorney, Agent, or Firm* — Vichit Chea; Price Heneveld LLP

(57) ABSTRACT

A vehicle seating assembly includes a first seating unit having a backrest, which includes a front side and a back side. An armrest is operably coupled with an intermediate portion of the back side and is configured for use by a passenger seated in a second seating unit disposed behind but laterally offset from the first seating unit. The armrest is moveable between an in-use position, wherein an upper surface of the armrest is generally horizontally positioned and available to support the passenger, and a stowed position, wherein the armrest is generally adjacent to a rear face of the backrest of the first seating unit.

5 Claims, 11 Drawing Sheets

(56) References Cited

U.S. PATENT DOCUMENTS

| | | | | |
|---|---|---|---|---|
| 2,833,334 | A | * | 5/1958 | Hunt, Jr. ................ B60N 3/004 108/134 |
| 3,685,854 | A | | 8/1972 | Cadiou |
| 3,807,799 | A | * | 4/1974 | Freedman ................ 297/411.32 |
| 3,985,374 | A | * | 10/1976 | Powaska ................ B60R 21/20 248/240.4 |
| 4,218,092 | A | | 8/1980 | Schach et al. |
| 4,558,901 | A | * | 12/1985 | Yokoyama ........... B60N 2/4613 297/113 |
| 4,668,010 | A | * | 5/1987 | Fujiwara ................ 297/150 |
| 4,681,344 | A | * | 7/1987 | Majerus ................ B60R 21/02 280/751 |
| 4,796,913 | A | * | 1/1989 | Amabile et al. ............. 280/751 |
| 4,973,017 | A | * | 11/1990 | Takagi ................ B60N 2/4613 248/292.13 |
| 5,096,256 | A | * | 3/1992 | Mouri ................ B60N 2/4613 297/113 |
| 5,433,503 | A | * | 7/1995 | De Filippo .......... B60N 2/4613 297/113 |
| 5,435,624 | A | | 7/1995 | Bray et al. |
| 5,456,019 | A | | 10/1995 | Dowell et al. |
| 5,620,228 | A | * | 4/1997 | Ito ................ A47C 7/68 248/311.2 |
| 5,737,845 | A | | 4/1998 | Marasus |
| 5,878,672 | A | * | 3/1999 | Ostermann ........... B60N 3/004 108/25 |
| 6,135,548 | A | * | 10/2000 | McGuire ................ A47C 13/00 297/163 |
| 6,609,757 | B2 | * | 8/2003 | Ott ................ B60N 2/46 297/112 |
| 8,523,281 | B2 | | 9/2013 | Wahls |
| 2007/0052264 | A1 | * | 3/2007 | Lee ................ B60N 2/3081 297/188.04 |
| 2007/0052275 | A1 | * | 3/2007 | Ghilzai ................ A47C 1/06 297/423.12 |
| 2007/0241235 | A1 | | 10/2007 | Atchison |
| 2011/0012396 | A1 | * | 1/2011 | Laake ................ 297/188.14 |
| 2012/0146374 | A1 | * | 6/2012 | Fujiwara ................ 297/257 |
| 2012/0267933 | A1 | * | 10/2012 | von Rothkirch und Panthen ............... B60N 2/4686 297/411.32 |

FOREIGN PATENT DOCUMENTS

| | | | |
|---|---|---|---|
| DE | 102007060818 A1 | | 6/2009 |
| DE | 102012006485 A1 | * | 10/2013 |
| EP | 0669245 A1 | | 8/1995 |
| FR | 1323260 A | * | 4/1963 ............. A47C 7/546 |
| FR | 2826616 A1 | | 1/2003 |
| FR | 2885329 A1 | * | 11/2006 |
| FR | 2961142 A1 | | 12/2011 |
| GB | 1012559 | | 8/1964 |
| GB | 1358783 | | 7/1974 |
| JP | 59184035 A | * | 10/1984 |
| JP | 06072222 A | * | 3/1994 |
| WO | 8200618 | | 3/1982 |
| WO | 9903377 A1 | | 1/1999 |
| WO | 2008110814 A2 | | 9/2008 |
| WO | 2009083773 A1 | | 7/2009 |
| WO | 2013111167 A1 | | 8/2013 |

OTHER PUBLICATIONS

Honest John, "Volkswagen unveils XL1 concept car," Jan. 25, 2011 (3 pages), HonestJohn.co.uk.

Chappell, Dale, "Bugatti Type 23 'Brescia', staggered seating detail, c1926," Feb. 1, 2011 (2 pages), Chappells 10.

Quick, Darren, "Audi urban concept defies conventional categorization," Aug. 9, 2011 (9 pages), Gizmag.

Taylor, Alfred, "Amazing world of three-wheeled vehicles," Sep. 22, 2011 (18 pages), Judgmental.

SAE International, "Devices for Use in Defining and Measuring Vehicle Seating Accommodation," 2014 (1 page).

Jalopy Journal.com, "An Early Factory Hot Rod, The Jesse Vincent Speedster," date unknown (13 pages), Lexis Legal Community.

Early American Automobiles.com, "History of Early American Automobile Industry 1891-1929," date unknown (30 pages).

USPTO, Office Action for U.S. Appl. No. 14/076,919, dated May 22, 2014 (11 pages).

* cited by examiner

MOTOR VEHICLE SEAT HAVING AN ARMREST

CROSS-REFERENCE TO RELATED APPLICATIONS

The present application is related to U.S. patent application Ser. No. 14/076,919 (now U.S. Pat. No. 9,102,243), filed Nov. 11, 2013 entitled "SEATING ARRANGEMENT FOR A PASSENGER VEHICLE"; U.S. patent application Ser. No. 14/076,928 (now U.S. Pat. No. 9,446,686), filed Nov. 11, 2013, entitled "SEATING ARRANGEMENT FOR A PASSENGER VEHICLE"; U.S. patent application Ser. No. 14/076,954 (now U.S. Pat. No. 8,973,966), filed Nov. 11, 2013, entitled "SEATING ARRANGEMENT FOR A PASSENGER VEHICLE"; U.S. patent application Ser. No. 14/076,964 (now U.S. Pat. No. 8,950,796), filed Nov. 11, 2013, entitled "SEATING ARRANGEMENT FOR A PASSENGER VEHICLE"; and U.S. patent application Ser. No. 14/076,969 (now U.S. Pat. No. 8,888,160, filed Nov. 11, 2013, entitled "SEATING ARRANGEMENT FOR A PASSENGER VEHICLE", all of which are incorporated herein by reference in their entireties.

FIELD OF THE INVENTION

The present invention generally relates to motor vehicles and in particular to the provision of an armrest for a rear seated passenger of a motor vehicle having two seats arranged in an offset configuration.

BACKGROUND OF THE INVENTION

It is well known for a passenger seat to be provided with a foldable armrest that can be moved into an in-use position when used by the passenger and can be stowed or folded away when not being used by the passenger.

SUMMARY OF THE INVENTION

According to one aspect of the present invention, a vehicle seating assembly includes a first seating unit having a backrest, which includes a front side and a back side. An armrest I operably coupled with an intermediate portion of the back side and is configured for use by a passenger seated in a second seating unit disposed behind but laterally offset from the first seating unit. The armrest is moveable between an in-use position, wherein an upper surface of the armrest is generally horizontally positioned and available to support the passenger, and a stowed position, wherein the armrest is generally adjacent to a rear face of the backrest of the first seating unit.

According to another aspect of the present invention, a vehicle seating assembly includes a seating unit having a backrest, which includes a front side and a back side. An armrest is operably coupled with an intermediate portion of the back side and is configured to project rearwardly from the seating unit. The armrest is moveable between an in-use position, wherein the armrest extends generally horizontally and a stowed position, wherein the armrest is generally adjacent to the backrest of the seating unit.

It is an object of the invention to provide a seat having an armrest that is particularly suitable for fitment to a motor vehicle having a staggered seating arrangement.

According to a first aspect of the invention there is provided a motor vehicle seat having backrest including an internal frame and an armrest for use by a person sat behind but laterally offset from the seat wherein the armrest is rotatably connected to part of the internal frame of the backrest of the seat so as to permit the armrest to be moved about a horizontally disposed axis between an in-use position in which an upper surface of the armrest is substantially horizontally disposed to a stowed position in which the armrest is disposed so as to lie adjacent to a rear face of the backrest of the seat.

A stop device may be provided to limit movement of the armrest from the stowed position so as to dispose the upper surface of the armrest in the substantially horizontal in-use position when it abuts against the stop.

The backrest may be adjustable for inclination and the stop may be an adjustable stop that is automatically adjusted to compensate for changes in the inclination of the backrest so as to ensure that the upper surface of the armrest is in the substantially horizontal in-use position when it abuts against the stop.

Alternatively, a latching mechanism may be provided so as to permit the armrest to be held in at least one angular position with respect to the rear face of the backrest.

The at least one angular position may be an angular position in which the upper surface of the armrest is substantially horizontally disposed.

The inclination of the backrest may be adjustable and the latching mechanism may permit the armrest to be held secure in a number of different angular positions with respect to the rear face of the backrest so as to enable the armrest to be disposed substantially horizontally irrespective of the inclination of the backrest.

The seat may be a front seat and, when in the in-use position, the armrest may provide a support for an arm of a passenger using a rear seat.

Advantageously, the armrest may be rotatably connected directly to part of the internal frame of the backrest.

Advantageously, the means used to rotatably connect the armrest to the part of the frame of the backrest may be located within the armrest so as to conceal the means used to rotatably connect the armrest to the part of the frame of the backrest from view irrespective of the rotational position of the armrest.

The armrest may be rotatably connected to the part of the frame of the backrest by a pivot pin arrangement and the pivot pin arrangement may be substantially concealed from view irrespective of the rotational position of the armrest.

The armrest may include at least one cup holder.

According to a second aspect of the invention there is provided a seating arrangement having a front seat and a rear seat arranged in a staggered arrangement with respect to the front seat such that the front seat is positioned forward of the rear seat but offset with respect to it wherein the front seat is a seat constructed in accordance with said first aspect of the invention.

The rear seat may partially overlap the front seat both transversely and longitudinally.

According to a third aspect of the invention there is provided a motor vehicle having a seating arrangement constructed in accordance with said second aspect of the invention.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which:

FIG. 12a is a plan view of a second embodiment of an armrest assembly in accordance with the invention;

FIG. 12b is a side plan view of the armrest assembly shown in FIG. 12a;

DETAILED DESCRIPTION OF THE EMBODIMENTS

Figure 1:
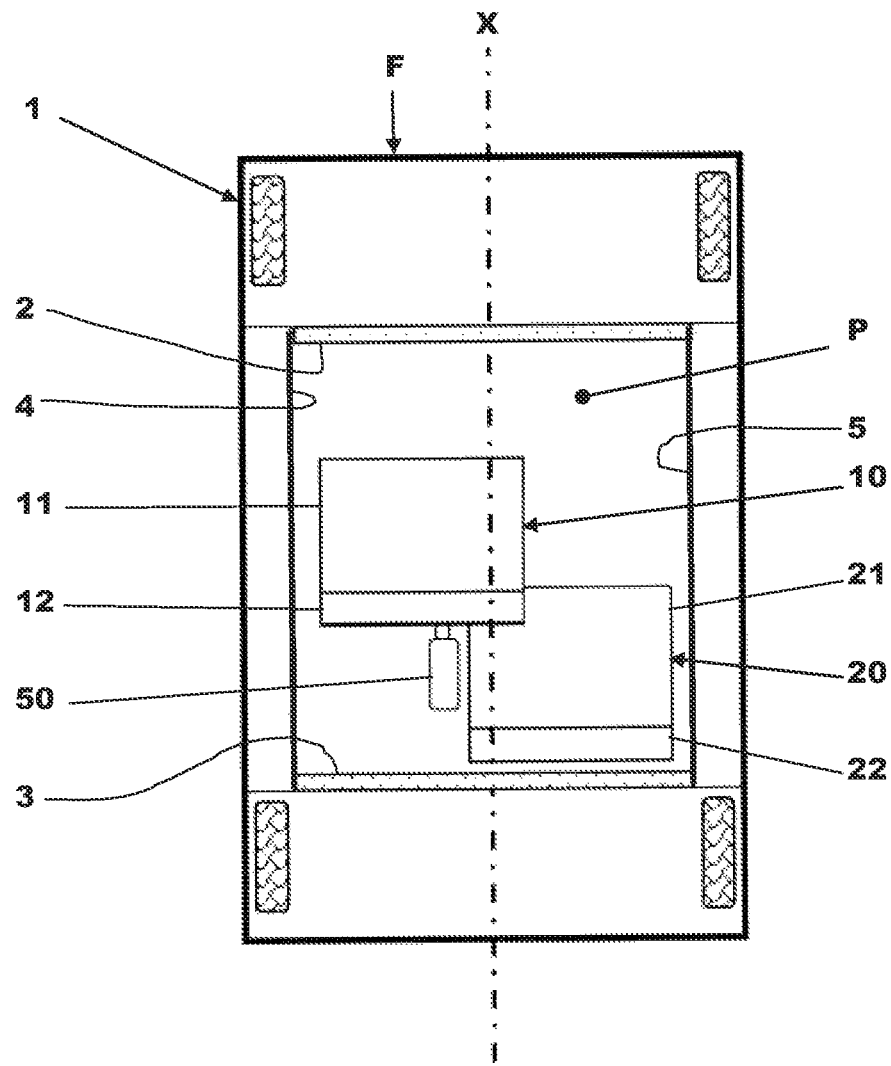
FIG. 1 is a diagrammatic plan view of a motor vehicle having a seating arrangement according to a second aspect of the invention including a seat constructed in accordance with a first aspect of the invention showing an armrest forming part of the seat in an in-use position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With particular reference to FIGS. 1-6 there is shown a motor vehicle 1 having a front end 'F' and a passenger compartment 'P' defined by respective front, rear and side walls 2, 3 and 4, 5. The motor vehicle 1 has in this case four road wheels, is of a compact design and includes a source of motive power used to drive at least two of the four road wheels.

A seating arrangement including of a front seat 10 for a driver of the motor vehicle 1 and a rear seat 20 for a passenger of the motor vehicle 1 are located in the passenger compartment 'P'. The front and rear seats 10 and 20 are arranged in a staggered configuration so that a passenger sat on the rear seat 20 is located to the rear of the front seat 10 and is offset with respect to the front seat 10 such that the legs of the passenger sat on the rear seat 20 can pass by an inboard side of the front seat 10. The front seat 10 has a seat cushion or squab 11 and a backrest 12 and the rear seat 20 has a seat cushion or squab 21 and a backrest 22.

Figure 2:
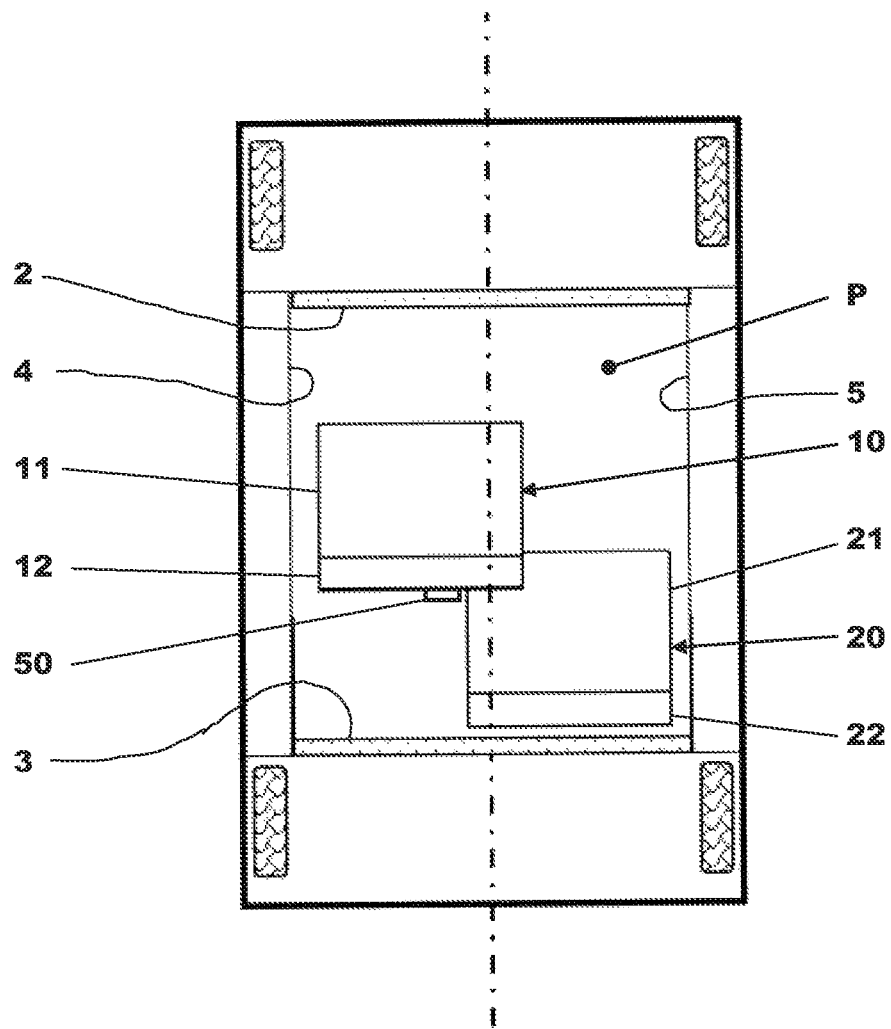
FIG. 2 is a view similar to FIG. 1 but showing the armrest in a stowed position.
Figure 3:
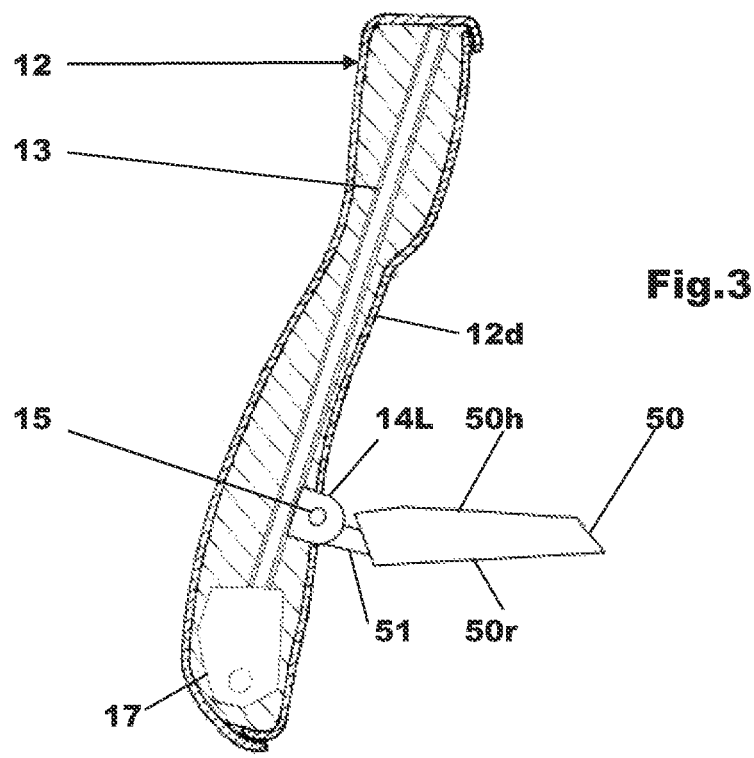
FIG. 3 is a partial cross-sectional side view of a backrest of a seat showing a first embodiment of an armrest assembly in an in-use position.

An armrest assembly including an armrest 50 for a passenger sat on the rear seat 20 is rotatably connected to the backrest 12 of the front seat 10 so as to enable the armrest 50 to be rotated about a transverse horizontal axis between an in-use position, as shown in FIG. 1, and a stowed position, as shown in FIG. 2, in which the armrest 50 lies adjacent to or against a rear face of the backrest 12. In the in-use position the armrest 50 projects rearwardly from the backrest 12 and is arranged substantially horizontally.

The armrest 50 is rotatably connected directly to a support frame 13 of the backrest 12 by means of a pair of spaced apart flanges 14L, 14R attached to a cross-rail 16 of the support frame 13 and by a pivot pin 15. A support flange 17 is provided at a lower end of each of two uprights forming part of the support frame 13 for use in rotatably connecting the backrest 12 to a support frame of the seat squab 11.

The armrest 50 has an arm support surface 50h for use by a passenger when the armrest is in the in-use position and a reverse surface 50r which faces downwardly when the armrest 50 is in the in-use position.

The arm support surface 50h lies adjacent a rear face of the backrest 12 when the armrest 50 is in the stowed position. The rear face of the backrest 12 includes a depression 12d in which the armrest 50 is stowed so as to reduce or eliminate any rearward projection of the armrest 50 from the surrounding rear face of the backrest 12.

The armrest assembly includes a support arm 51 attached at one end to the armrest 50. The support arm 51 has at an opposite end to the end where it is attached to the armrest 50 an aperture through which the pivot pin 15 extends so as to pivotally or rotatably connect the armrest 50 to the support frame 13 of the backrest 12. The support arm 51 is not fastened to the pivot pin 15 but rather is axially slideable on the pivot pin 15 which is fastened at one or both ends to one or both of the flanges 14L, 14R.

A latching mechanism 20 is provided to enable the armrest 50 to be held in a number of angular positions relative to the backrest 12. The latching mechanism 20 includes of an annular plate having a serrated or toothed surface secured to a right hand flange 14R of the pair of flanges 14L, 14R and an annular serrated or toothed surface on one side of the support arm 51. The pivot pin 15 extends through both of the toothed surfaces which are arranged concentrically with respect to the pivot pin 15. A spring 21 is interposed between a left hand flange 14L of the pair of flanges 14L, 14R and the support arm 51 so as to bias the support arm 51 towards the right hand flange 14R and maintain the two toothed surfaces in latching engagement.

When the two toothed surfaces are engaged with one, the armrest 50 is held in position and is not free to rotate relative to the backrest 12. By displacing the armrest 50 in the direction of arrow D on FIG. 5 the force of the spring 21 is overcome and the two toothed surfaces are disengaged from one another. The armrest 50 is then free to rotate relative to the backrest 50 about a horizontal axis that corresponds to a longitudinal axis of the pivot pin 15.

Operation of the armrest assembly is as follows, when not in use the armrest 50 is stowed so as to lie against the rear face of the backrest 12 in the depression 12d in a substantially vertically extending position and is held in this position by the latching mechanism 20.

When the armrest 50 is being used, a passenger slides the armrest assembly laterally by applying a force to the armrest 50 so as to disengage the latching mechanism 20 and then rotates the armrest 50 to a desired in-use position. When in the in-use position the armrest 50 is normally disposed substantially horizontally because an armrest so disposed is comfortable for use. It will be appreciated that, if the backrest 12 has a recline adjuster allowing its inclination to be varied, then any variation in inclination angle can be accommodated by latching the armrest 50 in a different angular position relative to the backrest 12.

Figure 7:
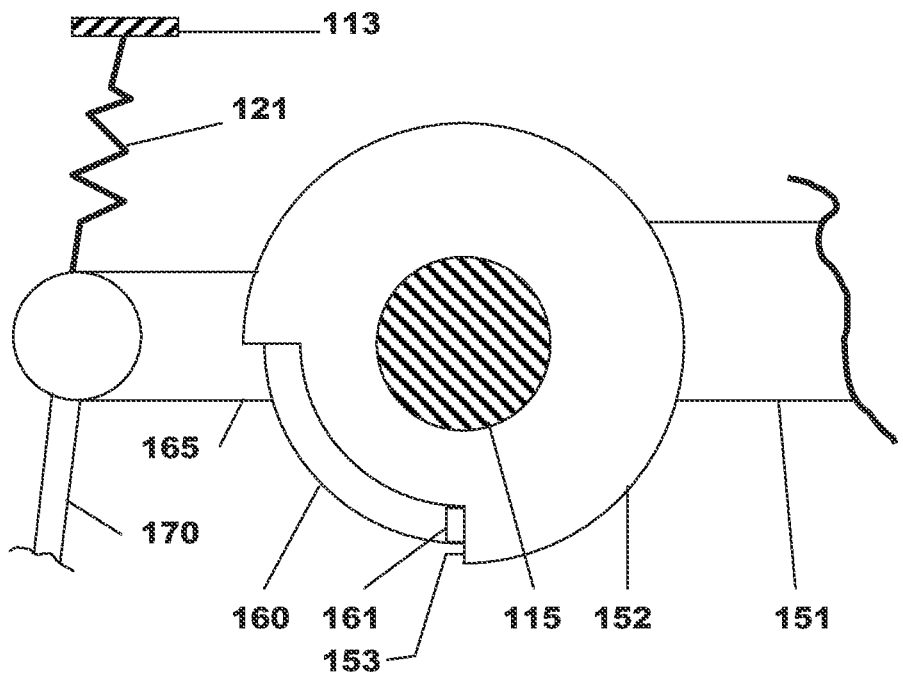
FIG. 7 is a diagrammatic side view of a first embodiment of an adjustable stop for an armrest.

With reference to the embodiment illustrated in FIG. 7, there is shown an alternative means for locating an armrest in an in-use position. In this case a stop 161 is provided on a stop plate 160 that is rotatably engaged on a pivot pin 115 located as per the pivot pin 15 previously described and is attached to a support frame 113 of a backrest in a similar manner to the pivot pin 15. A support arm 151 forming part of an armrest assembly is, as before, rotatably supported on the pivot pin 115 and has a travel limiting plate 152 including an abutment face 153 for abutment against the stop 161. The stop plate 160 has an arm 165 to which is attached a spring 121 and one end of a linkage 170. The spring 121 is connected between the arm 165 and part of the support frame 113 of the backrest. The spring 121 biases the stop 161 in a clockwise direction as viewed against the action of the linkage 170.

When the armrest is in the in-use position the abutment face 153 of the travel limiting plate 152 abuts against the stop 161 so as to prevent further clockwise rotation of the support arm 151. In this position the armrest is substantially horizontally disposed.

The angular position of the stop plate 160 is controlled by the linkage 170 which is connected at a lower end to a part of the seat in such a manner that, if the backrest is reclined more than its current inclination, the linkage 170 causes the stop plate 160 to be rotated in a counter clockwise direction and vice-versa if the inclination of the backrest is reduced. An adjustable stop is therefore provided that enables the armrest or to be more precise, an upper surface of the armrest, to be positioned substantially horizontal when in the in-use position.

A catch can be provided to hold the armrest in the stowed position. The armrest is held in the in-use position by the effect of gravity and any load applied to it from a passenger. It will be appreciated that a fixed stop could be used but this has the disadvantage that the armrest will not then be maintained in a substantially horizontal position if the backrest angle is varied. In such a case the fixed stop would be set for a predefined backrest inclination for which the armrest would be substantially horizontally disposed and for other backrest inclination angles the armrest would not be substantially horizontally disposed.

Figure 8:
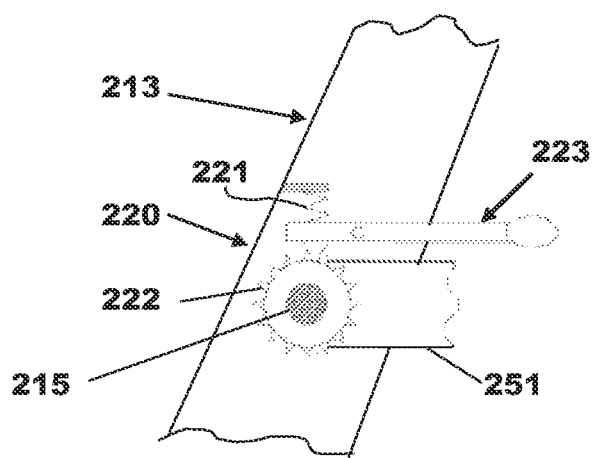
FIG. 8 is a diagrammatic side view of a second embodiment of a latching means for latching an armrest in the in-use position.

With reference to FIG. 8 a second embodiment of a latching mechanism 220 is shown. The latching mechanism 220 is used to hold an armrest in a number of different angular positions with respect to a backrest to which the armrest is rotatably connected via a pivot pin 215 and brackets.

The latching mechanism 220 includes a serrated wheel 222 and a detent arm 223. The serrated wheel 222 is fastened to a support arm 251 forming part of an armrest assembly that is rotatably connected directly to part of a frame 213 for the backrest by means of the pivot pin 215. The detent arm 223 is pivotally connected to the frame 213 and has at least one tooth for engagement with the serrated wheel 222 so as to prevent rotation of the support arm 251 relative to the frame 213. A spring 221 is used to bias the tooth of the detent arm 223 into engagement with the serrated wheel 222.

With reference again to the embodiment illustrated in FIG. 8, by applying a force in the direction of the arrow "U" on FIG. 8 to a free end of the detent arm 223 the tooth on the detent arm 223 is disengaged from the serrated wheel 222 and the armrest is then free to rotate about a substantially horizontal axis defined by the pivot pin 215 between respective in-use and stowed positions. When the armrest is positioned angularly in a desired position the force is removed from the detent arm 223 and the armrest is then held in the desired rotational position by the engagement of the tooth on the detent arm 223 with the serrated wheel 222.

Figure 9:
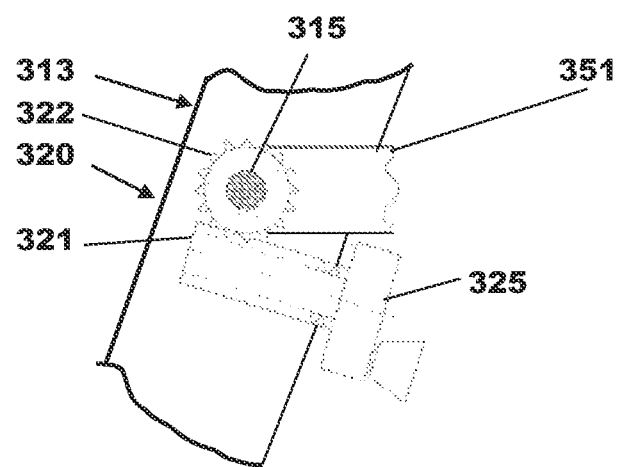
FIG. 9 is a diagrammatic side view of a third embodiment of a latching means for latching an armrest in the in-use position.

With reference to FIG. 9 a third embodiment of a latching mechanism 320 is shown. The latching mechanism 32 is used to hold an armrest in a number of different angular positions with respect to a backrest to which the armrest is rotatably connected via a pivot pin 315 and brackets. The latching mechanism 320 includes a worm wheel 322 and a worm 321 that are inter-engaged. A handle 325 is attached or formed as part of the worm 321 for use by a passenger to cause rotation of the worm 321. The worm wheel 322 is fastened to a support arm 351 that is rotatably connected directly to part of a frame 313 for the backrest by means of the pivot pin 215. The armrest is connected to the frame 313 via the support arm 351.

Rotation of the worm 321 by a passenger will cause the armrest to be rotated relative to the backrest about a horizontal axis defined by the pivot pin 315 in a direction dependent upon the direction of rotation of the worm 321. Therefore the armrest can be moved by the passenger between in-use and stowed positions by rotation of the handle 325 in an appropriate direction.

Figure 10:
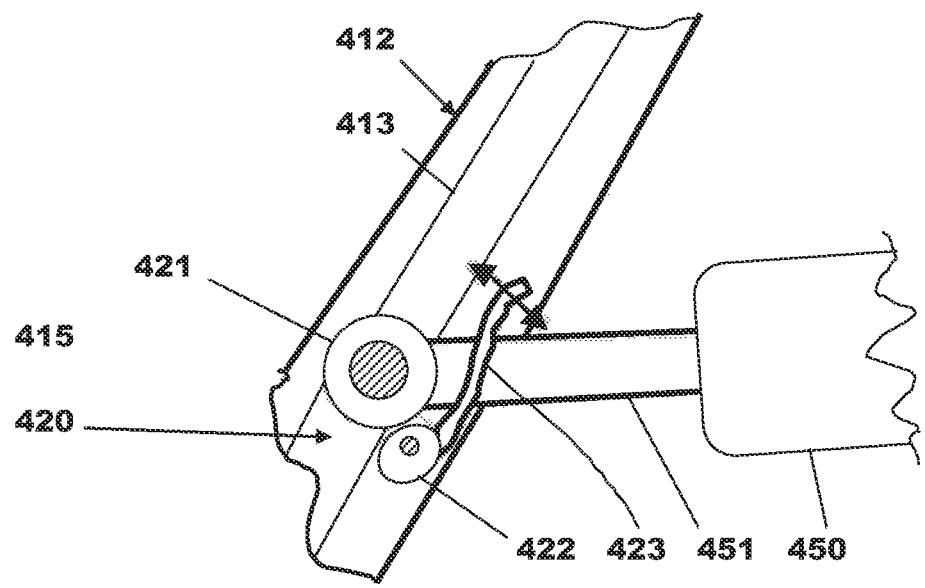
FIG. 10 is a diagrammatic side view of a fourth embodiment of a latching means for latching an armrest in the in-use position.

With reference to FIG. 10 a fourth embodiment of a latching mechanism 420 is shown. The latching mechanism 420 used to hold an armrest 450 in a number of different angular positions with respect to a backrest 412 to which the armrest 450 is rotatably connected via a pivot pin 415 and brackets is shown. The latching mechanism 420 includes a wheel 421 and a cam 422 that can be brought into engagement by rotation of the cam 422 using a lever 423.

The wheel 421 is fastened to a support arm 451 forming with the armrest 450 an armrest assembly. The support arm 451 is rotatably connected directly to part of a frame 413 for the backrest 412 by means of the pivot pin 415. The armrest 450 is connected to the frame 413 via the support arm 451 for rotation about a transverse horizontal axis of the backrest 412 defined by the pivot pin 415. Rotation of the arm 423 by a passenger will cause the cam 422 to be rotated into or out of engagement with the wheel 421 depending upon the direction of rotation of the arm 423. The surface of the cam 422 and/or the wheel 421 has a high friction compressible layer to enable the cam 422 to easily provide sufficient latching force to hold the armrest 450 in position.

When the cam 422 is urged into contact with the wheel 421 the armrest 450 is held in that rotational position and when the cam 422 is moved so as not to be engaged with the wheel 421 the armrest 450 is free to rotate between in-use and stowed positions. In the in-use position the armrest 450 is normally set so as to be disposed substantially horizontally irrespective of the inclination of the backrest 412. However, it will be appreciated that the actual disposition of the armrest 450 is set by the potential user and so is not necessarily exactly horizontal.

Figure 11:
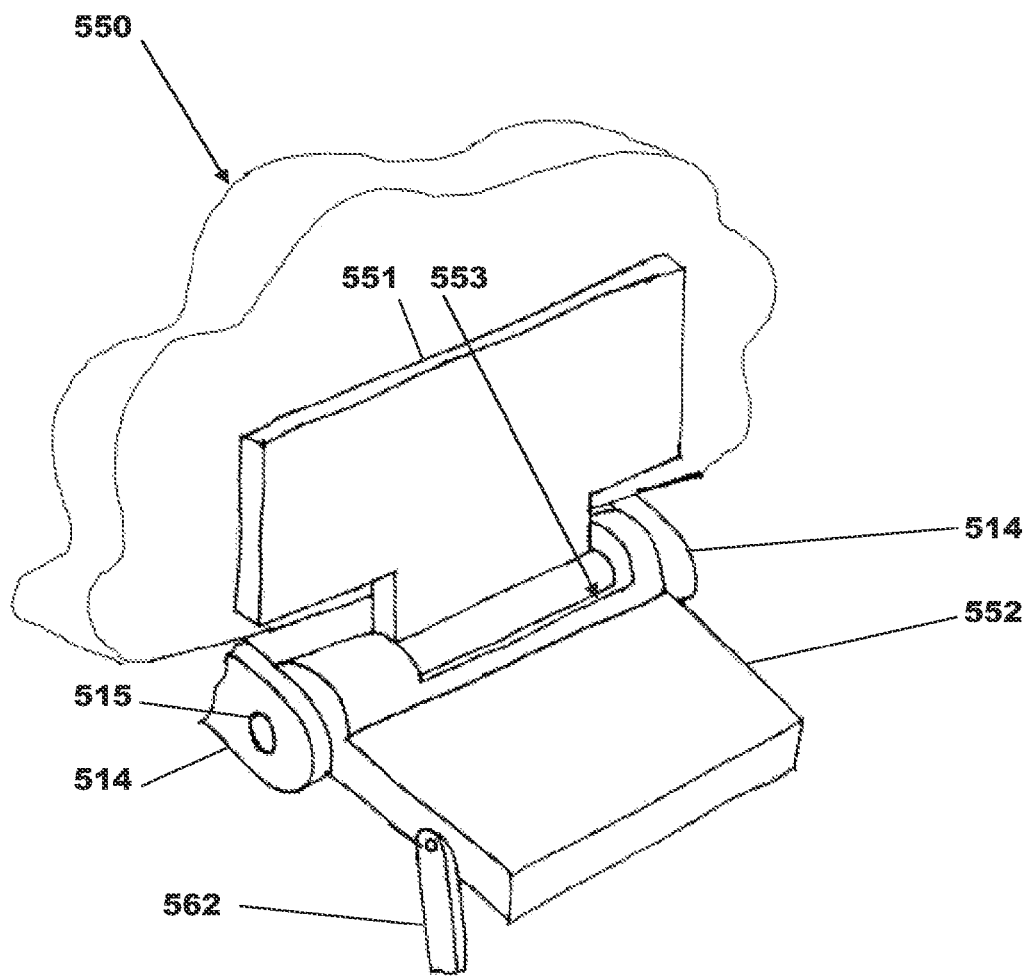
FIG. 11 is a pictorial perspective view of a second embodiment of an adjustable stop for an armrest.

With reference to FIG. 11 there is shown a second embodiment of an adjustable stop for an armrest 550 connected to a backrest of a seat.

The armrest 550 (shown in a stowed orientation in FIG. 11) is connected to a pair of spaced apart support flanges 514 by means of a pivot pin 515 of a hinge having two leaves 551, 552. A first leaf 551 is used to connect the armrest 550 to the pivot pin 515 and so forms with the armrest 550 an armrest assembly, the second leaf 552 forms an adjustable stop and is connected via a linkage 562 to another part of the seat of which the backrest forms a part. The linkage 562 is arranged such that, if the inclination of the backrest is changed, the position of the second leaf 552 is automatically changed so as to move the adjustable stop formed by the second leaf 552.

If the armrest 550 is moved from a stowed position in which it lies against a rear face of the backrest to which it is rotatably attached to an in-use position, the first leaf 551 is rotated in a clockwise direction as viewed in FIG. 11 it contacts an abutment surface 553 on the second leaf 552.

Further clockwise rotation of the armrest 550 is prevented by the abutment of the first leaf 551 with the abutment surface 553 on the second leaf 552 which is held in position by the linkage 562. The in-use position of the armrest 550 is therefore determined by the angular position of the second leaf 552 which is controlled by the linkage 562.

If the backrest is inclined from a first position to a second more inclined position, the action of the linkage 562 is to rotate the second leaf 552 in a counter clockwise directions and vice-versa if the backrest is moved to a less inclined position.

It will be appreciated that the pair of spaced apart flanges 514 are fastened to part of a support frame for the backrest so that the armrest is rotatably connected directly to the backrest.

Figures 12A, 12B:
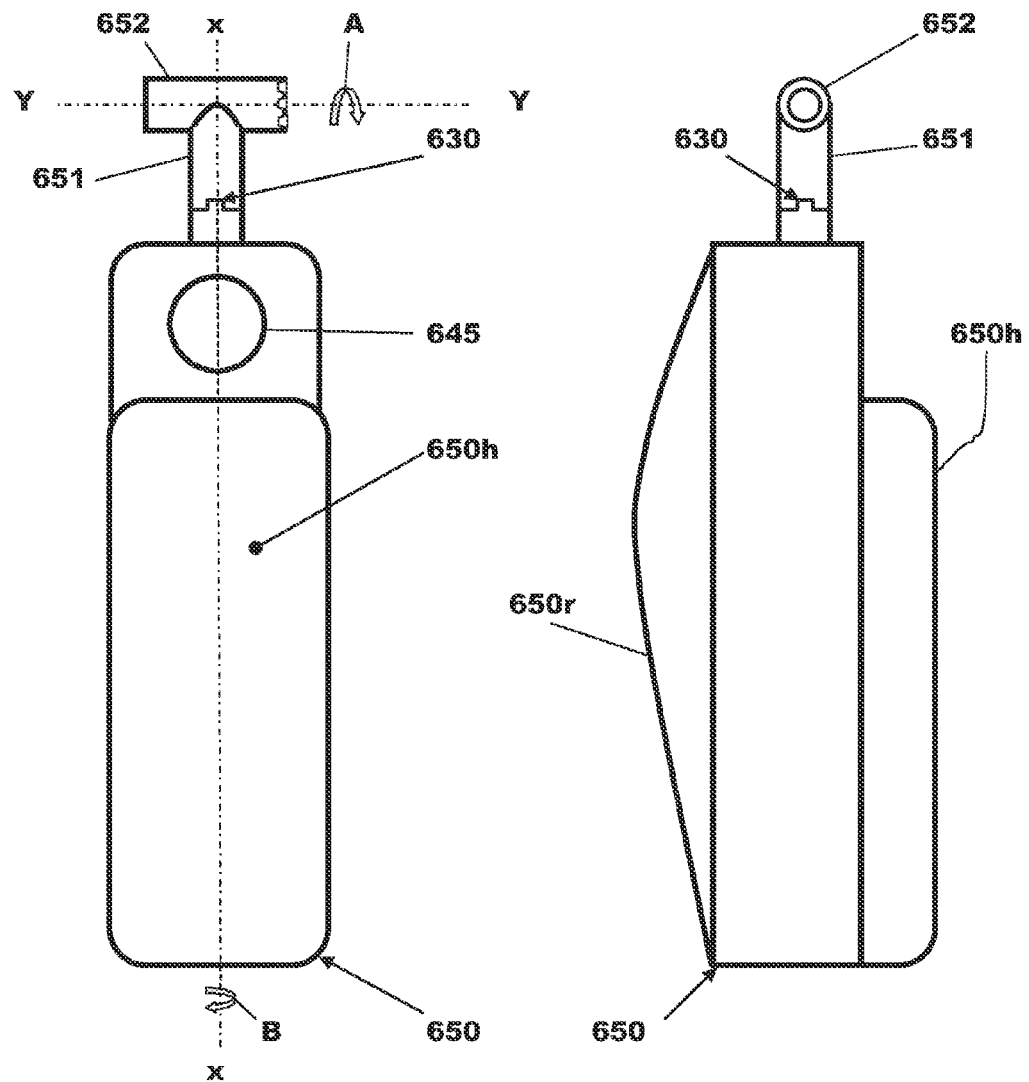

With reference to FIGS. 12a and 12b there is shown an armrest assembly including an armrest 650 suitable for rotatable attachment to a rear face of a seat such as the seat 10 and is intended to be a direct replacement for the armrest 50. The armrest 650 has an outer part having a padded first surface 650h for use by a passenger of the motor vehicle such as the motor vehicle 1 when the armrest 650 is in an in-use position. The outer part of the armrest 650 also has a second surface 650r that is shaped so as to complement a depression (such as the depression 12d shown in FIGS. 3 and 4) formed in a rear surface of the seat to which the armrest 650 is rotatably connected. The armrest 650 also includes a cup holder 645 for use when the armrest is in the in-use position. The armrest assembly further includes a support arm 651 formed as two parts that are rotatably connected together. An outer one of the two parts of the support arm 651 is connected at one end to the armrest 650. The outer part of the support arm 651 is rotatable relative to an inner part of the support arm 651 about an axis x-x as indicated by the arrow "B". The support arm 651 includes a detent mechanism 630 between the two parts of the support arm 651 to enable the armrest 650 to be held into two positions arranged 180 degrees apart. A spring is used to maintain the detent mechanism 630 engaged unless it is overcome by the application of a releasing force by a passenger.

Figure 5:
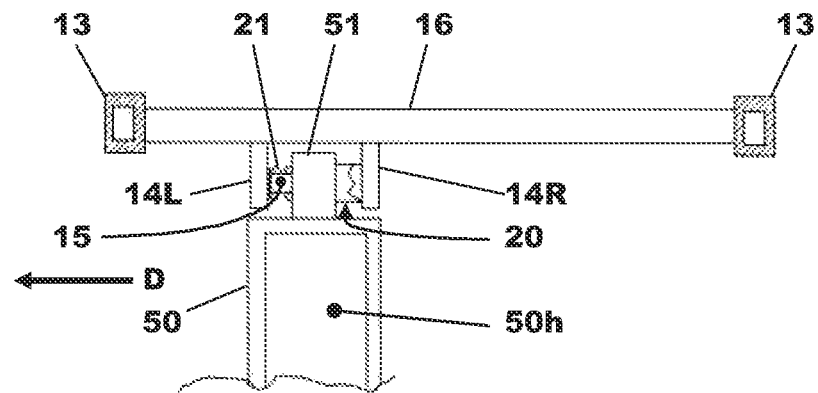
FIG. 5 is a partial cross-sectional elevational view of part of the structure of the backrest shown in FIGS. 3 and 4 showing a first embodiment of a latching mechanism for latching an armrest in the in-use position.
Figure 6:
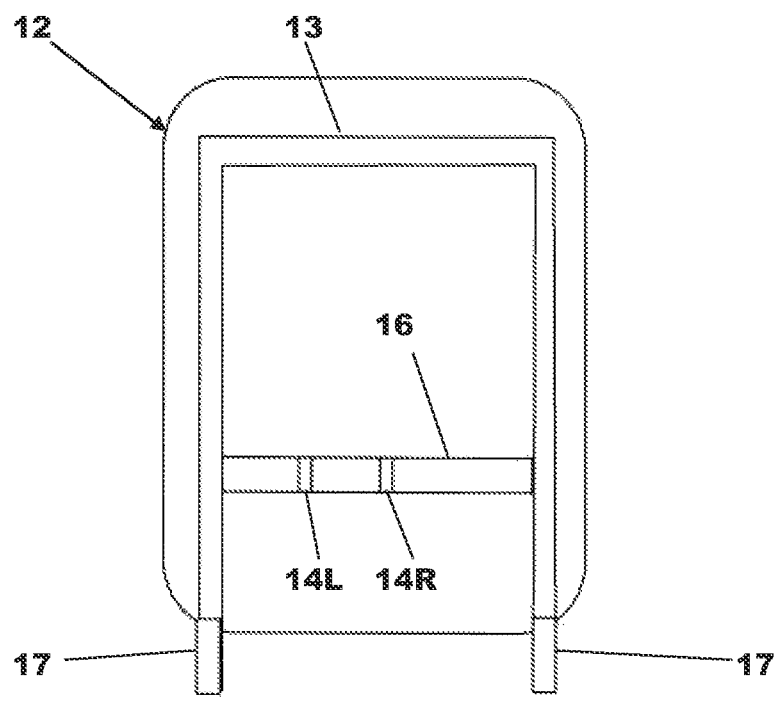
FIG. 6 is a rear view of the backrest shown in FIGS. 4 and 5 with the backrest rear covering removed so that an underlying support frame for the backrest can be seen.

With reference to FIGS. 5 and 6, an inner part of the support arm 651 is attached to a support tube 652 having a bore sized to slidingly and rotatably accommodate a pivot pin to provide a pivotal connection to a support structure attached to a frame of the backrest such as the two flanges 14. The rotatable engagement of the support tube 652 with the pivot pin permits the armrest 650 to be rotated about and axis Y-Y as shown by the arrow "A" on FIG. 12a between respective in-use and stowed positions.

Figure 4:
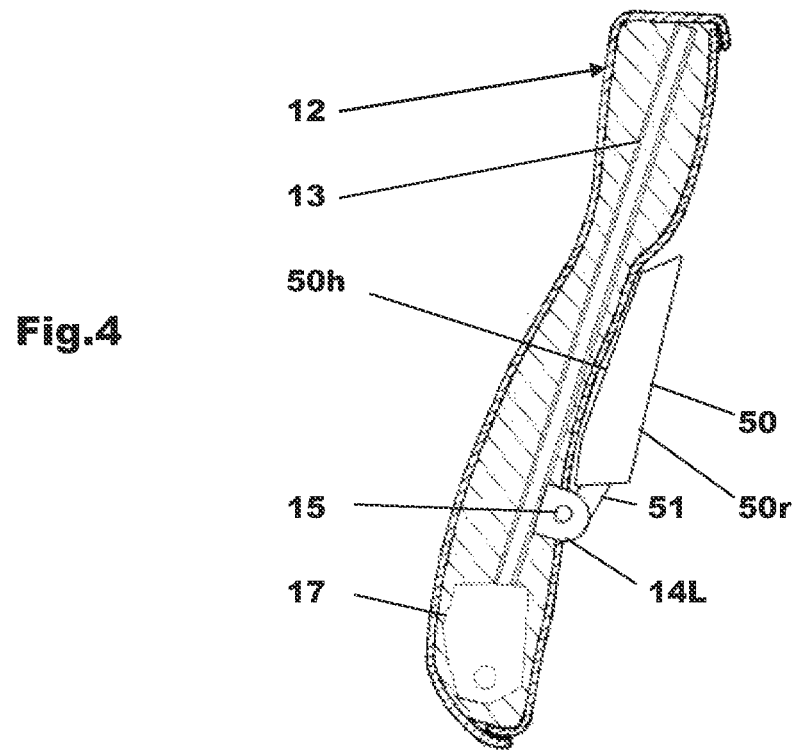
FIG. 4 is a partial cross-sectional side view of the backrest of the seat shown in FIG. 3 but showing the armrest assembly in a stowed position.

A latching mechanism such as that shown in FIG. 4 can be used to hold the armrest 650 in the in-use and stowed positions or any other suitable latching mechanism could be used. The primary difference between the armrest 650 and the armrest 50 is that, when the armrest 50 is stowed, the surface used by a passenger is positioned adjacent the rear face of the seat whereas, because the armrest 650 is able, due to the split nature of the support arm 651, to be rotated it enables the second face 650r to be positioned adjacent the rear face of the backrest.

This has the advantage in some cases that the soft or padded first surface 650h of the armrest 650 is exposed when the armrest 650 is stowed thereby providing a less rigid surface in the event that the passenger impinges against it.

A second possible advantage is that the second face 650r can be shaped to match the depression in the rear surface of the backrest and so, potentially, the armrest 650 can be stowed more neatly in the backrest.

As before, the armrest 650 is moveable between an in-use position, in which the first surface 650h is arranged substantially horizontally, and a second or stowed position, in which the armrest 650 is positioned adjacent the rear face of the backrest. The latching mechanism is used to hold the armrest 650 in the stowed and in-use positions. It will be appreciated that the armrest could also be used with an adjustable stop device instead of a latching mechanism.

In the preceding embodiments the axis about which the armrest rotates and the components of the armrest assembly used to facilitate rotation about this axis are both located externally of the armrest. These components are therefore visible to a passenger of the motor vehicle. However it is desired if both the pivot axis and the components of the armrest assembly used to facilitate rotation about this axis are both located within the armrest because the components are then obscured from view.

Figure 13:
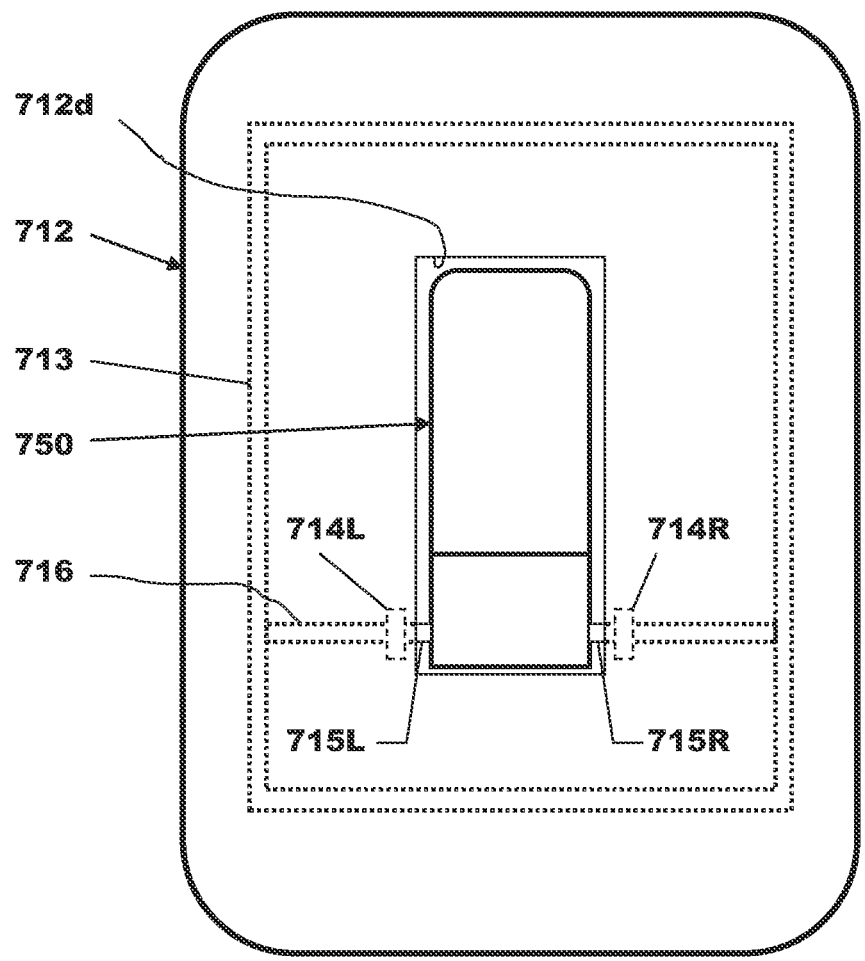
FIG. 13 is a rear plan view of a backrest of a seat showing an armrest assembly according to a third embodiment of the invention.
Figure 15:
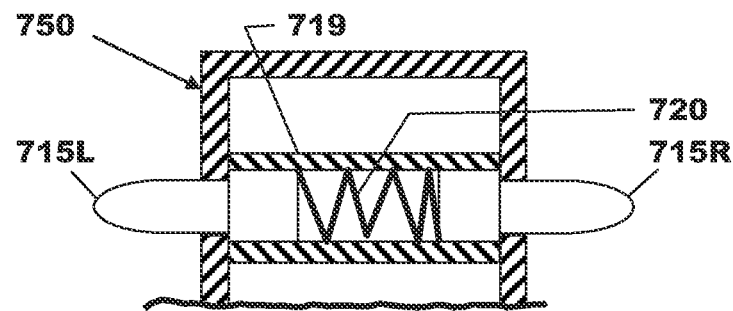
FIG. 15 is a partial plan cross-sectional plan view of the armrest shown in FIGS. 13 and 14a showing a pivot pin arrangement used to rotatably connect the armrest to the backrest.
Figure 14A:
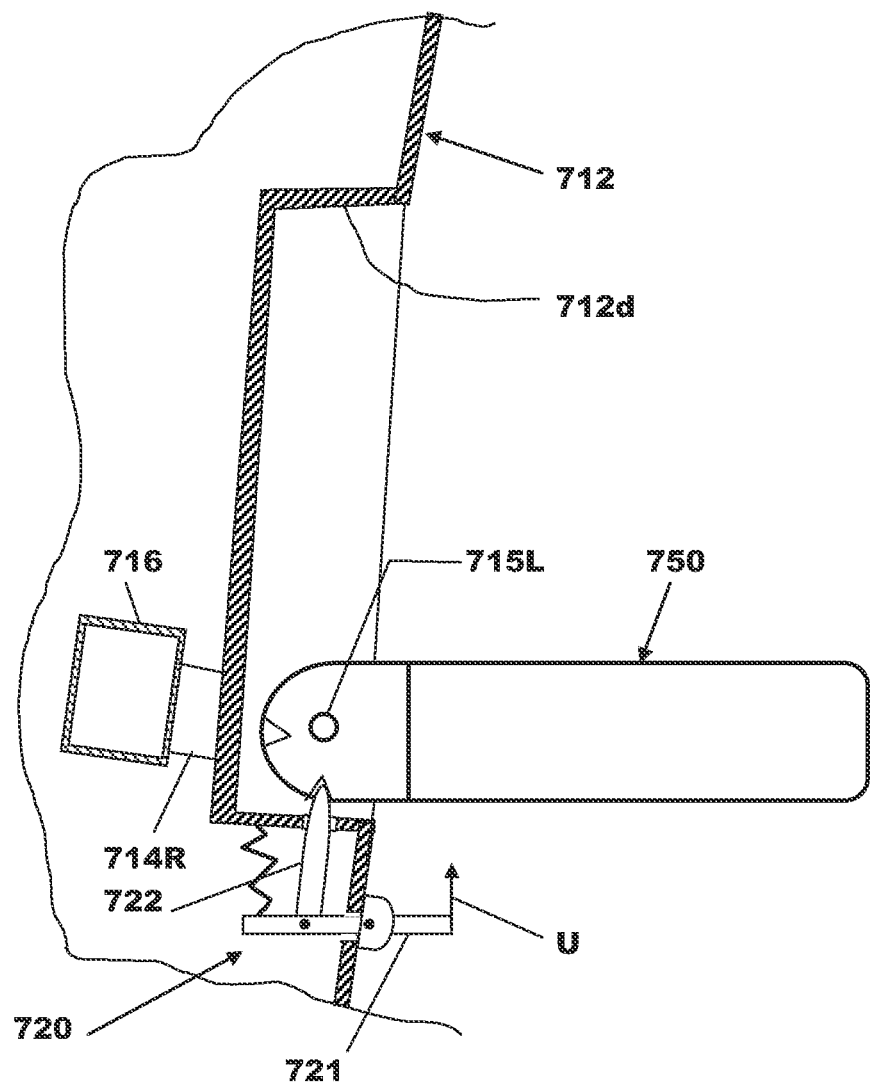
FIG. 14a is a partial cross-sectional perspective view of the backrest shown in FIG. 13 showing an armrest in an in-use position.
Figure 14B:
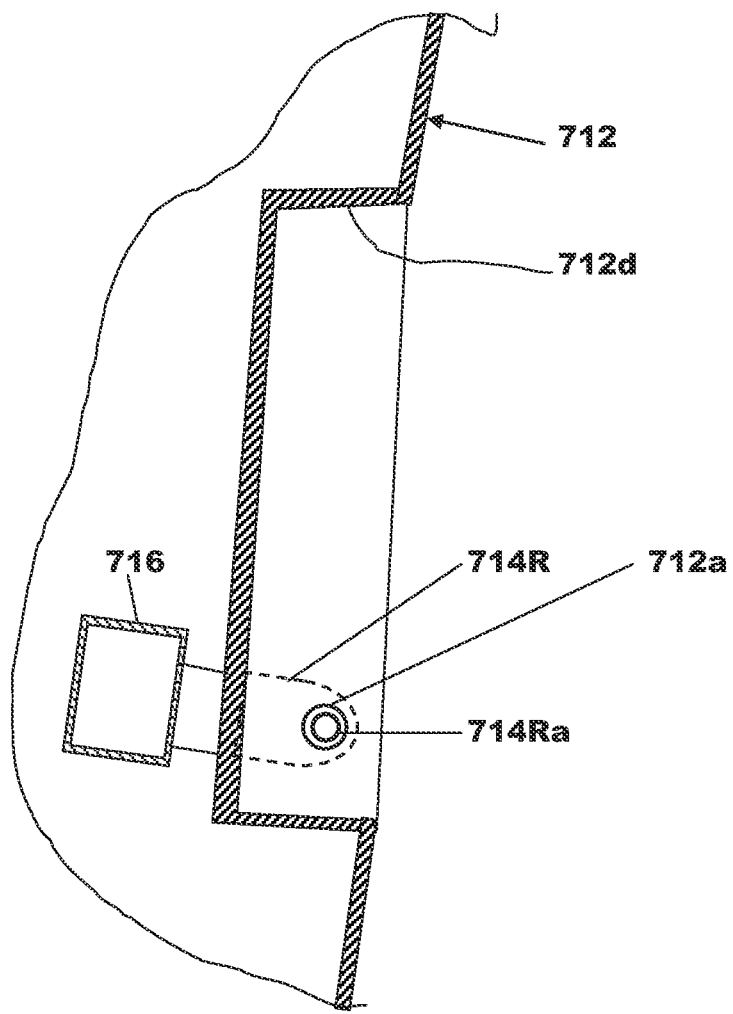
FIG. 14b is a view similar to FIG. 14a but showing the backrest with the armrest removed.

With this in mind a particularly advantageous embodiment of a seat having an armrest located on a rear face of a backrest of the seat for use by a passenger seated to the rear but offset from the seat is shown in FIGS. 13-15. The armrest assembly is intended to be a direct replacement for the armrest assembly shown in FIGS. 3 and 4.

The armrest assembly includes an armrest 750 and a support means in the form of a tube 719 fixed within the armrest 750 to a structural part of the armrest, two pivot pins 715R, 715L and a helical compression spring 720. The seat has a backrest 712 including an internal frame 713 (shown as a dotted outline on FIG. 13) including a cross-rail 716 to which is attached a pair of spaced apart supports 714L, 714R for rotatably attaching the armrest 750.

Each of the supports 714L, 714R has an aperture 714Ra, 714La therein of which the aperture 714Ra in the right hand support 714R is shown in the Figures. The apertures 714Ra, 714La are provided to accommodate a respective end portion of one of the pivot pins 715R, 715L so as to rotatably connect the armrest 750 to the backrest 712. The two pivot pins 715R, 715L are slidingly supported in the tube 719 which is attached inside the structural part of the armrest 750. The two pivot pins 715R, 715L are biased apart by the helical compression spring 720. By applying force to the ends of the two pins 715R, 715L the spring 720 can be compressed thereby permitting the pins 715R, 715L to be engaged with respective apertures 714Ra, 714La in the supports 714R, 714L via apertures 712a in a trim panel on the rear of the backrest 712.

Once so engaged the means used to rotatably connect the armrest 750 to the backrest 712, namely, the pins 715R, 715L, the spring 720 and the tube 719 are all concealed from view irrespective of the rotational position of the armrest 750. It will be appreciated that a very small part of each pivot pin 715R, 715L may still be seen (as shown on FIG. 13). The amount of the pins 715R, 715L that can be seen will depend upon the clearance between the armrest 750 and the depression or recess 712d in the backrest 712 in which it is fitted and this will normally be very small (circa 1 mm).

As before the armrest 750 is rotatable about a transverse horizontal axis defined by the pivot pins 715R, 715L from a stowed position in which it lies adjacent a rear face of the backrest 712 in the depression 712d to an in-use position in which it is positioned such that an upper surface of the armrest 750 is substantially horizontally disposed (as shown in FIG. 14a).

A latching mechanism 720 is shown on FIG. 14a in schematic for holding the armrest 750 in the stowed and in-use positions. The latching mechanism 720 includes a lever 721 connected to a pin 722 for engagement with a recess in a structural outer part of the armrest 750. A spring holds the pin 722 into engagement with the recess unless an unlatching force is applied to the lever 721 in the direction of arrow "U". A second recess is shown positioned to hold the armrest 750 in its stowed position.

It will be appreciated that more recesses could be provided so as to accommodate variations in the inclination angle of the backrest 712 or alternative types of latching mechanism could be used including latching mechanisms that automatically compensate for such changes in backrest inclination angle.

It will be appreciated that the lateral positioning of the armrest in each case will depend upon several factors including the positioning of the seats and the size of occupant for which the armrest is designed to accommodate. However, in general terms the lateral positioning of the armrest will such as to be suitable for use by an adult occupant of the rear seat when it is in the in-use position and so will be disposed to the side of the rear seat.

Therefore in summary an armrest is provided as part of a seat for use by a passenger seated on a further seat to the rear and offset from the seat to which the armrest is rotatably attached.

If the seat has a backrest that is adjustable in terms of inclination then it is desirable if a means is provided to permit the armrest to be held in a substantially horizontal position when it is in an in-use position irrespective of the inclination of the backrest.

It will be appreciated that various alternative mechanisms could be used to hold or locate the armrest in a substantially horizontal position when in the in-use position and that the exemplar mechanisms shown and described herein are a few of many possible alternatives. Similarly, although the use of a pivot pin or pins for rotatably attaching the armrest to the backrest is particularly convenient and cost effective other means could be used such as, for example, one or more hinges.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
a first seating unit having a backrest including:
  a front side; and
  a back side;
an armrest operably coupled with an intermediate portion of the back side and configured for use by a passenger seated in a second seating unit disposed behind but laterally offset from the first seating unit, the armrest being moveable between an in-use position, wherein an upper surface of the armrest is generally horizontally positioned and available to support the passenger, and a stowed position, wherein the armrest is generally adjacent to a rear face of the backrest of the first seating unit, and wherein the armrest is rotatably coupled directly to part of an internal frame of the backrest and includes a rotational coupling at an internal portion of the armrest, the rotational coupling being concealed from view regardless of the rotational position of the armrest; and
a latching mechanism operably coupled with the backrest, wherein the backrest is adjustable for inclination and the latching mechanism is configured to secure the armrest in a plurality of different angular positions with respect to the rear face of the backrest such that the armrest can be horizontally positioned regardless of the inclination of the backrest.

2. The vehicle seating assembly of claim 1, further comprising:
a stop that abuts the armrest and limits downward movement of the armrest when the armrest is generally horizontally positioned.

3. The vehicle seating assembly of claim 1, wherein the first seating unit is a front seat and, when in the in-use position, the armrest provides support for an arm of a passenger seated in a rear seat.

4. The vehicle seating assembly of claim 1, wherein the armrest is rotatably connected to a frame of the backrest by a pivot pin arrangement and the pivot pin arrangement is substantially concealed from view regardless of the rotational position of the armrest.

5. The vehicle seating assembly of claim 1, wherein the armrest includes at least one cup holder.

* * * * *